(12) United States Patent
Peukert

(10) Patent No.: US 12,554,870 B2
(45) Date of Patent: Feb. 17, 2026

(54) USER INTERFACE FOR MANAGING EFFECTIVE PERMISSIONS ON A GRAPH DATABASE

(71) Applicant: Neo4j Sweden AB, San Mateo, CA (US)

(72) Inventor: Sascha Peukert, Dresden (DE)

(73) Assignee: Neo4j Sweden AB, San Mateo, CA (US)

( * ) Notice: Subject to any disclaimer, the term of this patent is extended or adjusted under 35 U.S.C. 154(b) by 136 days.

(21) Appl. No.: 18/637,855

(22) Filed: Apr. 17, 2024

(65) Prior Publication Data

US 2024/0362347 A1 Oct. 31, 2024

Related U.S. Application Data

(60) Provisional application No. 63/461,967, filed on Apr. 26, 2023.

(51) Int. Cl.
*H04L 29/06* (2006.01)
*G06F 21/60* (2013.01)

(52) U.S. Cl.
CPC .... *G06F 21/604* (2013.01); *G06F 2221/2113* (2013.01); *G06F 2221/2141* (2013.01)

(58) Field of Classification Search
CPC ........... G06F 21/604; G06F 2221/2113; G06F 2221/2141
See application file for complete search history.

(56) References Cited

U.S. PATENT DOCUMENTS

| 12,210,638 | B2 * | 1/2025 | Venable | G06F 21/6227 |
| 2023/0164189 | A1 * | 5/2023 | Danilchenko | H04L 63/10 726/1 |
| 2023/0316096 | A1 * | 10/2023 | Birru | G06F 3/048 715/764 |

* cited by examiner

*Primary Examiner* — Evans Desrosiers
(74) *Attorney, Agent, or Firm* — Van Pelt, Yi & James LLP

(57) ABSTRACT

A user interface to manage effective permissions on a graph database is disclosed. An input data identifying one or both of a portion of the graph database and a user or role associated with the graph database is received. For each of at least a subset of one or more nodes and one or more relationships comprising an identified portion of the graph database a set of selectable user controls is provided. A user input associated with changing the display state from the selected display state to the not selected display state, or vice versa, is received. A set of access rights data as stored in a memory is updated to associate with the identified user or role said set of one or more access rights with respect to the node or relationship in the identified portion of the graph database.

20 Claims, 9 Drawing Sheets

USER INTERFACE FOR MANAGING EFFECTIVE PERMISSIONS ON A GRAPH DATABASE

CROSS REFERENCE TO OTHER APPLICATIONS

This application claims priority to U.S. Provisional Patent Application No. 63/461,967 entitled USER INTERFACE FOR MANAGING EFFECTIVE PERMISSIONS ON A GRAPH DATABASE filed Apr. 26, 2023, which is incorporated herein by reference for all purposes.

BACKGROUND OF THE INVENTION

A graph database is a computerized record management system that uses a network structure with nodes, relationships, labels, and properties to represent data. A node may represent an entity such as a person, a business, an organization, or an account. Each node has zero or more labels that declare its role(s) in the network, for example as a customer or a product. Nodes have zero or more properties which contain user data. For example, if a node represents a person, the properties associated with that node may be the person's first name, last name, and age. Relationships connect nodes to create high fidelity data models. Relationships are directed, have a type which indicates their purpose and may also have associated property data (such as weightings).

Graph databases have various applications. For example, a graph database may be used in healthcare management, retail recommendations, transport, power grids, integrated circuit design, fraud prevention, and a social network system, to name a few.

Graph databases have traditionally used security methods in the form of permission lists to allow or disallow read or write access to data on behalf of a user or role. For example, a user may be authorized to read certain relationship types and node labels which limit the extent of their queries.

In U.S. patent application Ser. No. 17/150,983, entitled Correctness-Preserving Security for Graph Databases, filed Jan. 15, 2021, and published as U.S. Patent Publication No. US-2022-0012354-A1 on Jan. 13, 2022, now U.S. Pat. No. 11,709,960, issued on Jul. 25, 2023, the entire contents of which is incorporated herein by reference for all purposes, it was shown that traditional approaches do not work well for graphs, and a novel system of fine-grained permissions for reads, writes, and traversals based on node labels, properties, and relationship types was introduced. This is a powerful model but absent a technical solution, e.g., as disclosed below, the operator of the graph database must manage the sum of all the fine-grained security choices outside the database. These effective permissions can be complex and subtle, and as such can be prone to errors if processed manually.

BRIEF DESCRIPTION OF THE DRAWINGS

Various embodiments of the invention are disclosed in the following detailed description and the accompanying drawings.

DETAILED DESCRIPTION

Figure 1:
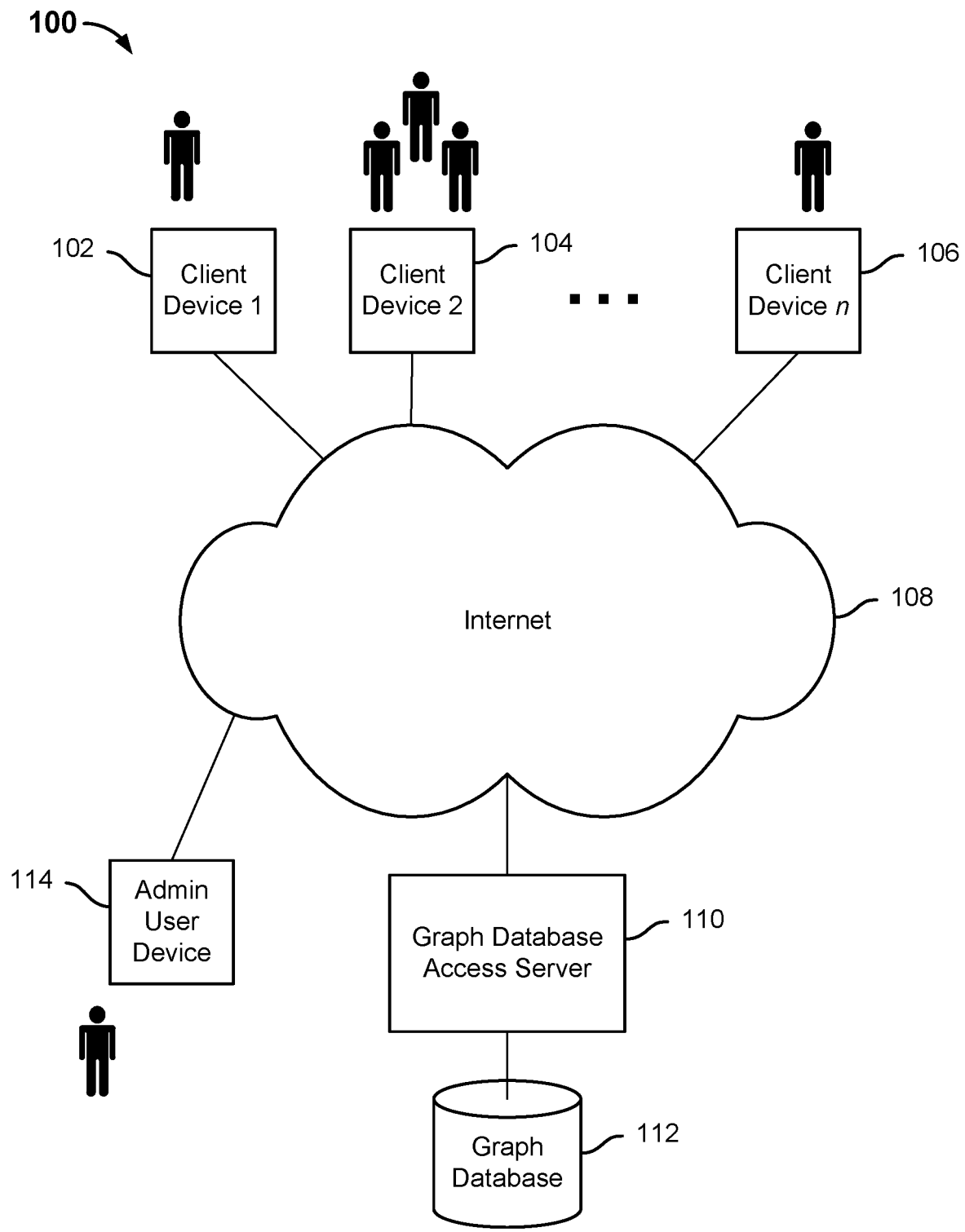
FIG. 1 is a block diagram illustrating an embodiment of a graph database system and environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to manage fine grained access privileges for a plurality of users and/or roles with respect to graph databases. In various embodiments, a graph database management system implements a security model that enables administrators or other authorized users to grant (or deny) rights to traverse portions of a graph with respect to which the user may not have other rights, such as the right to see or read data or metadata associated with the nodes and/or edges (i.e., relationships between nodes) comprising the path or graph portion to which the right to traverse has been granted (or denied). In various embodiments, the right to traverse a portion of a graph to which the user does not have other access rights enables correctness to be preserved, without compromising security, by enabling a query pattern that spans across such a graph portion to be matched, and a relevant result to be provided in response to the query, without allowing the user to access data to which the user does not have access rights.

In various embodiments, a traverse permission allows a (suitably authorized) query to process nodes or relationships in a graph in order to extend the reach of the query. Nodes and relationships may not be visible to the user but may be traversable such that paths explored by the query are not unduly or incorrectly curtailed. In various embodiments, traversing does not reveal information about the nodes or relationships themselves to the end user, only permitting the query processing engine to proceed down a path, or not. As such, queries logically execute on the required input graph to solve the query, which would be typically impossible if only read and write permissions were available.

In various embodiments, use of techniques disclosed herein simultaneously preserves correctness and privacy (security). The administrator can permit or deny parts of the graph to be traversed without leaking information to the end user to preserve privacy. Correctness is preserved since traversals are permitted where they would otherwise be curtailed by blanket denying reads, which prevents partial or incorrect results being returned to the user.

Techniques are disclosed to manage fine-grained effective permissions for graph operations. In various embodiments, a user interface and underlying logic are provided such that fine-grained security permissions can be managed on a per user and per role bases and that the aggregate of those permissions for those users and roles can be seen by overlaying the effective set of permissions over the graph's schema. In various embodiments, techniques disclosed herein enable an operator to verify that the correct set of fine-grained permissions have been granted to support the workload of a given user or role and to adjust those permissions accordingly.

In various embodiments, an interactive graphical user interface is provided for visualizing and changing the effective permissions for users and roles in a graph database management system. The user interface comprises technical bindings which connect the user interface to the graph database management system and allows changes the systems administrator decides upon to be enacted by the graph database management system.

FIG. 1 is a block diagram illustrating an embodiment of a graph database system and environment. In the example shown, graph database system and environment 100 includes a plurality of users, each associated with one or more client devices represented in FIG. 1 by client devices 102, 104, and 106. The client devices 102, 104, and 106 are connected via the Internet 108 (and/or one or more other networks) to graph database access server 110, which provides access to data stored in one or more graphs comprising graph database 112. An administrative user, represented in FIG. 1 by a user associated with an administrative user client device 114, accesses the graph database access server 110 to manage access permissions with respect to graphs stored in graph database 112, via a user interface as disclosed herein.

In the example shown in FIG. 1, a client device, such as client device 104, may have multiple different users associated with the client device. In various embodiments, graph database access server 110 may be configured, as disclosed herein, to afford different access rights to different respective users, each according to the access rights granted and/or denied to that user, as disclosed herein.

In various embodiments, graph database access server 110 implements and enforces/provides a "traverse" right, as disclosed herein. In various embodiments, the traverse right enables a user to traverse an associated portion of a graph without (necessarily) having access to data associated with one or more nodes and/or relationships so traversed. In various embodiments, a user may only access or modify data with respect to which a read or write permission, respectively, has been granted and not denied, as disclosed herein.

Figure 2:
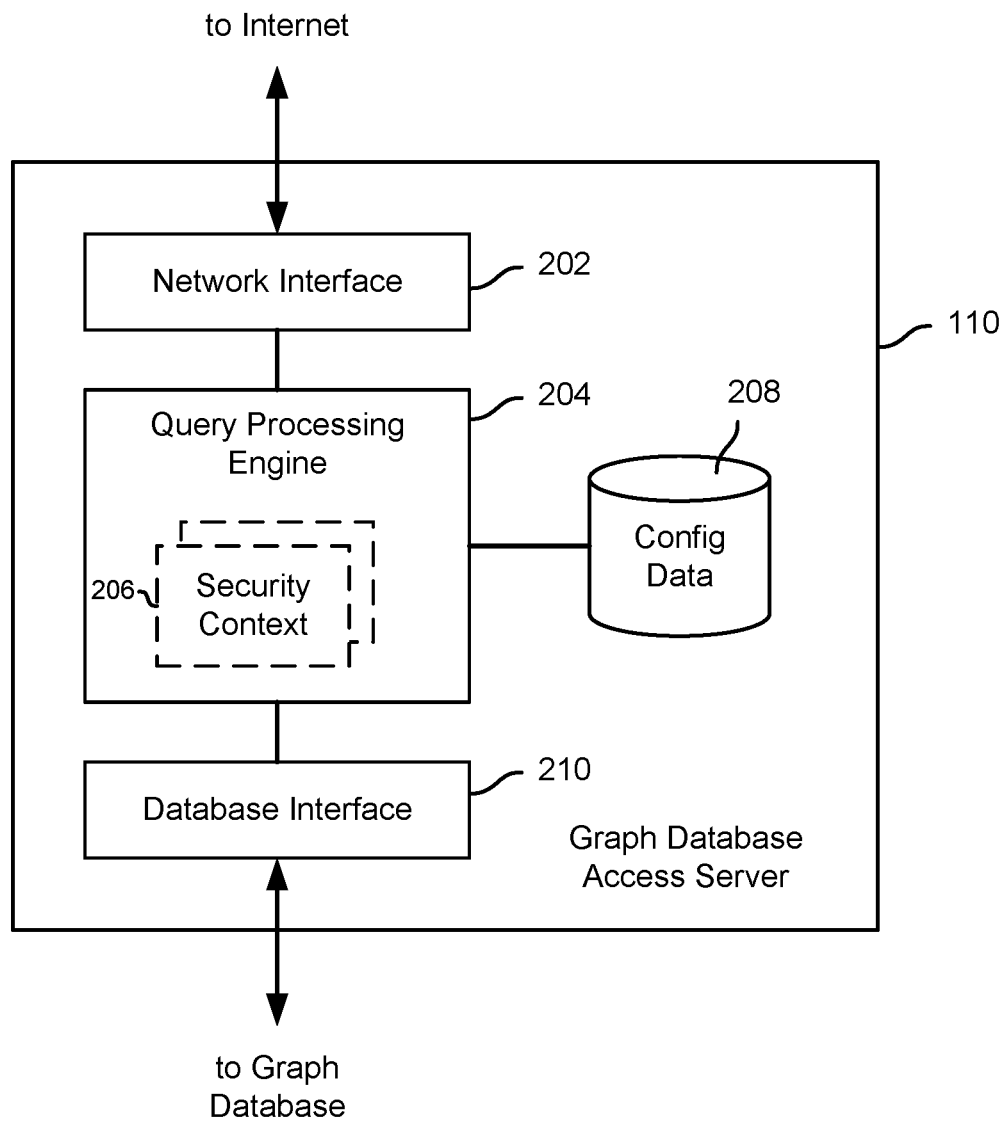
FIG. 2 is a block diagram illustrating an embodiment of a graph database access server.

FIG. 2 is a block diagram illustrating an embodiment of a graph database access server. In various embodiments, the graph database access server of FIG. 2 is used to implement the graph database access server 110 of FIG. 1. In the example shown, graph database access server 110 includes a network interface 202, such as a network interface card (NIC) and associated software entities, configured to communicate via the Internet and/or one or more other networks with client devices and/or other devices and systems, such as client devices 102, 104, and 106 of FIG. 1. For example, the graph database access server 110 may be configured to receive via network interface 202 database queries submitted via client devices such as client devices 102, 104, and 106 of FIG. 1.

In the example shown, graph database access server 110 further includes a query processing engine 204 configured to process queries received via network interface 202. Each query is processed in a manner determined at least in part by an associated security context 206. In various embodiments, configuration data 208 associated with a user is used to create an instance of security context 206 associated with that user. For example, configuration data 208 may include a text or other configuration file that defines access rights to be afforded to a given user or set of users (e.g., by group, region, role or other affiliation or attribute). The query processing engine 204 parses the configuration data 208 to create and enforce the security context 206. In various embodiments, the security context 206 may include and implement the "traverse" right or permission, as disclosed herein.

In various embodiments, access rights for a given user and/or role are set using a user interface as disclosed herein. An authorized administrative user, e.g., a user associated with administrative user device 114 of FIG. 1, uses a user interface as disclosed herein to manage access rights. The rights as indicated via the user interface are represented in access rights data stored in configuration data 208. The access rights data is subsequently used to create one or more instances of security context 206. Query processing engine 204 uses the security context(s) 206 to ensure access for a given user is provided according to the privileges as set by the administrative user via the user interface as disclosed herein.

The graph database access server 110 in the example shown in FIG. 2 further includes a database interface 210 via which the graph database access server 110 communicates with one or more graph databases, such as graph database 112 of FIG. 1.

In various embodiments, query processing engine 204 includes a number of processing modules to parse a received query; generate a plan to perform the query; execute the plan, including by obtaining a stream of potentially responsive data from the graph database; and generate and return a response to the query that is complete/correct (reflects results from all parts of the graph to which "traverse" permission is available) and secure (does not include data to which a user associated with the query has not been granted access).

In various embodiments, for each query, query processing engine 204 uses an associated security context 206 to ensure a correct and secure response is generated. Query processing engine 204 may use the security context 206 to determine which portions of the graph to access (e.g., traverse) to locate paths that match query patterns and/or may use the security context 206 to filter results to ensure access is not provided to data to which the requesting user has not been granted (or has been explicitly denied) access.

In various embodiments, on connecting to a graph database management system via a standard Web browser or rich client application, a user is invited to authenticate. Once successfully authenticated as a user with the appropriate system administration privileges, a security administration application as disclosed herein becomes available. The security administration application provides an interactive user interface as disclosed herein, to enable the administrative user to manage access rights as disclosed herein.

In various embodiments, a user interface as disclosed herein enables an administrative user to define the effective set of permissions that a user in a role has when interacting with a graph. In various embodiments, a user (or role) may be allowed or disallowed one or more of three different actions nodes and relationships in a graph:

Read—a query issued by the user is allowed to read and potentially return the data from a node or relationship record it encounters during query processing.

Write—a query issued by the user is allowed to write or delete a node or relationship record it encounters during query processing.

Traverse—a query issued by the user is allowed to pass through node or relationship records it encounters during query processing but is not allowed to read or write to them, nor return them to the user directly or indirectly as the result of some aggregate operation (e.g., node count).

In various embodiments, an interactive user interface as disclosed herein is provided. The user interface enables an administrative user to set privileges, e.g., one or more of the read, write, and traverse privileges as described above, with respect to a graph or portion(s) thereof. Interactive controls may be displayed in the context of the graph portions and/or elements to which an access right is to be set. Toggling or otherwise activating a control results in a corresponding change of the access right(s) for a give user, role, and/or set of users and/or roles with respect to a graph element (e.g., node, set of nodes, relationship, etc.) with which the control is associated, e.g., as described more fully below.

Figure 3A:
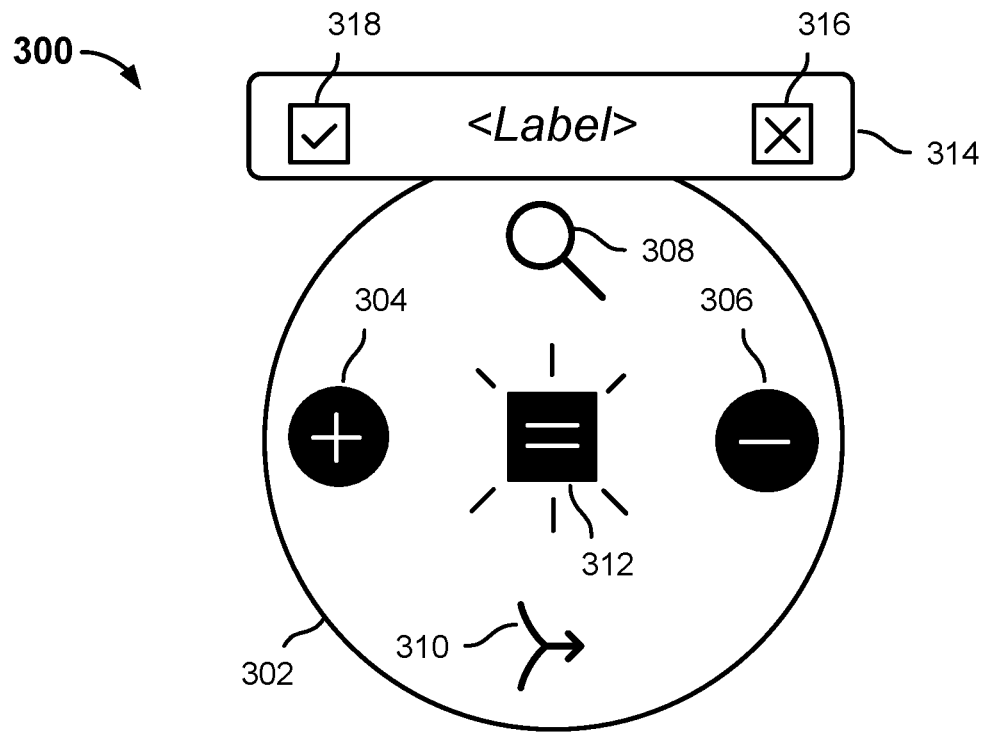
FIG. 3A is a diagram illustrating an example of a set of interactive user interface elements in an embodiment of a graph database system.

FIG. 3A is a diagram illustrating an example of a set of interactive user interface elements in an embodiment of a graph database system. In the example shown, user interface component 300 includes a set of elements to display information and control (e.g., toggle) access rights settings, including a set of access rights controls 302, in this example arranged in a circular display area. The set of access rights controls 302 includes togglable controls to grant or deny a right to add a node 304, remove (delete) a node 306, or traverse a node 308 of a node type (e.g., having a label) with which the component 300 is associated. The set of access rights controls 302 further includes a togglable control to merge 310 rights and to match 312 rights, e.g., to grant/deny rights as set elsewhere, such as in another user interface associated with a portion of the same or a related graph. In the example shown, the "match" control 312 is toggled on, as indicated by the lines shown to be radiating from the match control 312. The toggled on state may be indicated in any visibly discernable manner, e.g., by shifting from gray (toggled off) to a non-gray color associated with being toggled on.

In the example shown in FIG. 3A, the component 300 further includes a node label display area 314, in which text identifying a node or set of nodes or "all" nodes in a graph may be displayed, to indicate the node(s) with respect to which access rights may be changed, via interaction with a given instance of the component 300 as displayed via a user interface as disclosed herein. The component 300 further includes a cross box ("X" box) control 316, which can be toggled to grant or deny a privilege to "set" a label on a node; and a check box (or "tick" box) control 318, which can be toggled to grant or deny a privilege to remove a label on the node.

Figure 3B:
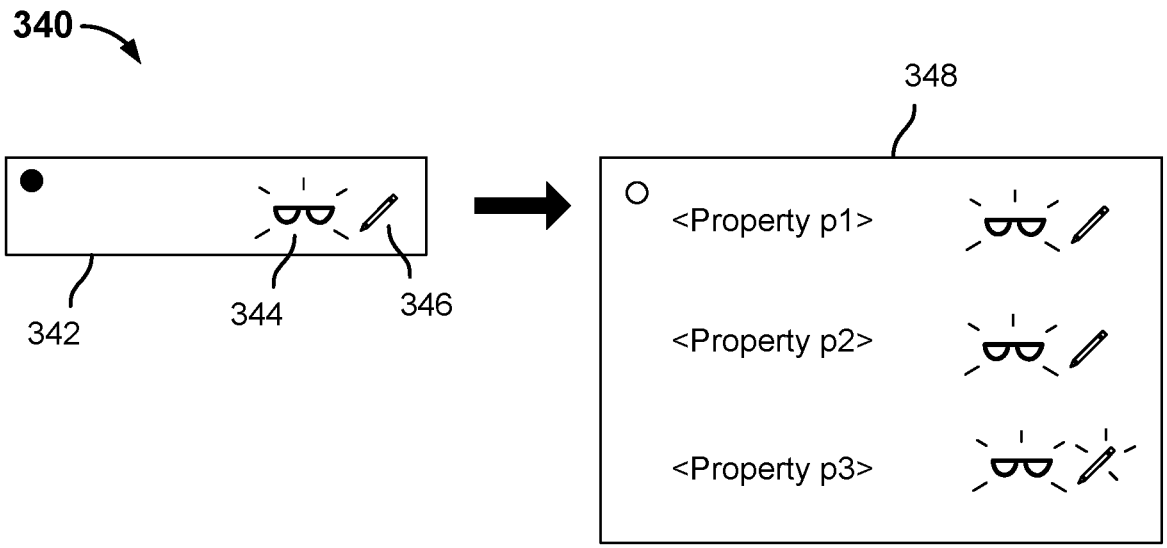
FIG. 3B is a diagram illustrating an example of a set of interactive user interface elements in an embodiment of a graph database system.

FIG. 3B is a diagram illustrating an example of a set of interactive user interface elements in an embodiment of a graph database system. In the example shown, a property subcomponent 340 is shown. An instance of subcomponent 340 may be associated with an instance of a node access rights user interface component, such as component 300 of FIG. 3A, or a relationship access rights user interface component. In the example shown, a collapsed property access rights display and control element 342 includes togglable controls to grant or deny rights to read 344 or write 346 all properties for a given node or set of nodes and/or relationship or set of relationships with which the property access rights display and control element 342 is associated. In the state as shown, the read access rights control 344 is selected, granting access rights to read properties in an associated node or relationship, but the write control 346 is not selected, indicating a user or role would not have the right to write all properties for an associated node or relationship—i.e., they would have the privilege to write to fewer than all or none of the properties.

At right in FIG. 3B, the property subcomponent 340 has been toggled into an expanded display and control 348, which displays and includes togglable controls for individual properties. As shown, the grant of the privilege to read all property values (i.e., control 344 toggled on) is propagated and represented in the expanded display and control 348 (i.e., all "read" property icons in selected state). Meanwhile, the "write" privilege has been granted just with respect to "Property p3" by toggling the "write" control in the expanded view.

In various embodiments, one or more user selectable controls as disclosed herein may have one of three selection (and corresponding display) states: neutral/unused—rights implicit, e.g., as/if inherited from a higher level selection, selected—rights affirmatively granted, may override as to a specific node/relationship/property a non-grant at a higher level, and de-selected—privileged expressly denied.

Figure 4:
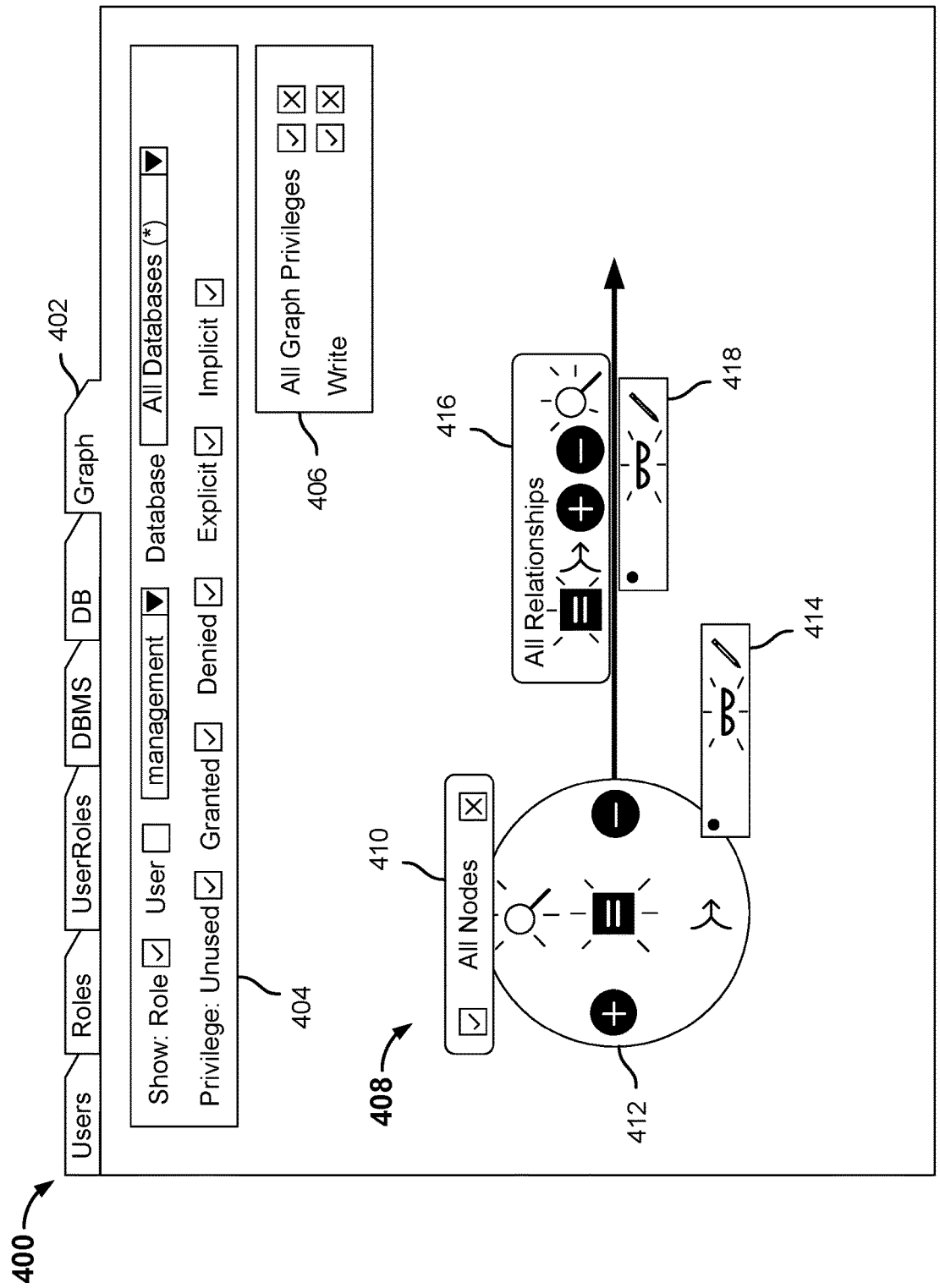
FIG. 4 is a diagram illustrating an example of a user interface page comprising interactive user interface elements in an embodiment of a graph database system.

FIG. 4 is a diagram illustrating an example of a user interface page comprising interactive user interface elements in an embodiment of a graph database system. In the example shown, user interface page 400 includes tabs to perform various administrative functions with respect to access rights, such as to define, view information about, and manage users, roles, the intersections of users and roles (e.g., view all users in a given role), manage graph database managements systems with which the page 400 is associated, and manage and control access rights for databases and graphs stored on such graph database managements systems.

In various embodiments, the system administrator is presented with a user interface page, such as page 400, that permits navigation between roles and graph databases hosted on the graph database management system. The administrator chooses a role and a database or multiple databases on which to operate. In the example shown in FIG. 4, in tab 402 of page 400, the system administrator has chosen to examine the "management" role on all databases in the graph database management system.

In a control set 404, the system administrator can filter information shown on the graphical user interface, in various embodiments. Specifically, they can use dropdowns (or text entry boxes) to select a role (or user) and database (or portion thereof), and they can enable/disable the display of the following items:

Unused—filters any privileges that are not set.
Granted—filters any privileges that have been granted.
Denied—filters any privileges that have been explicitly denied.
Explicit—filters any privileges that have been intentionally set by an operator.
Implicit—filters any privileges that arise through being inherited by other roles or those granted to all users in the database or databases.

Referring further to FIG. 4, tab 402 of page 400 further includes a set of global access rights controls 406, in this example including togglable to controls to explicitly set or deny "all graph privileges" or just "write" privileges with respect to the entire graph(s) indicated in control set 404 for the user(s) and/or role(s) indicated in control set 404. For example, toggling the check box (tick box) may grant the privilege graph-wide while toggling the cross box may affirmatively deny it.

The tab 402 of page 400 further includes a set of interactive access right control components 408, including a node label component 410 and node access right controls 412 as shown in FIG. 3A, and a set of node property controls 414 as shown in FIG. 3B, along with corresponding relationship label and access rights control component 416 and relationship property controls 418.

In the example shown in FIG. 4, the administrative user is viewing and controlling access rights to "all nodes" and "all relationships" in the view as shown. Such a view may be appropriate and useful to control access rights for a user in the "management" role. For other users and/or roles, or for finer grain control of access rights for the "management" role, in various embodiments an administrative user can interact with the tab 402 of page 400 and/or set of interactive access right control components 408 to drill down to specific portions of a database and/or graph, resulting in the display of interactive controls with respect to the nodes and/or relationships comprising that portion of the graph.

Figure 5A:
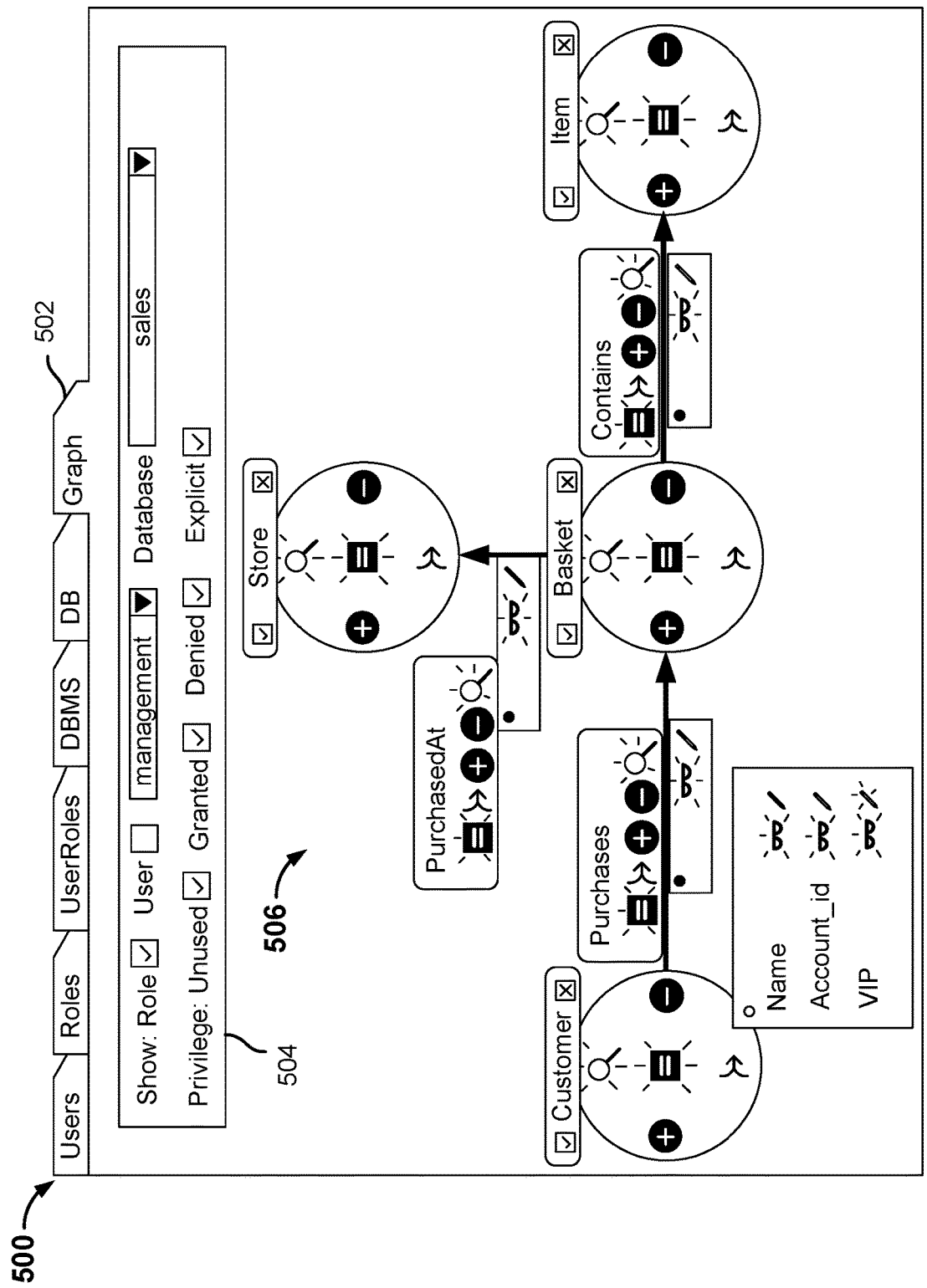
FIG. 5A is a diagram illustrating an example of a user interface page comprising interactive user interface elements in an embodiment of a graph database system.

FIG. 5A is a diagram illustrating an example of a user interface page comprising interactive user interface elements in an embodiment of a graph database system. In the example shown, page 500 includes tab 502 and control set 504, the latter having been used to select the "management" role with respect to the "sales" database, with the checkboxes for all privileges (unused, etc.) having been selected. As a result, a set of access rights control components 506 has been displayed, with the access rights controls for the nodes and relationships comprising the "sales" graph being displayed. In this example, access rights control elements for nodes (Customer, Store, Basket, Item) and relationships (Purchases, PurchasedAt, Contains) comprising the sales database are displayed in a manner that reflects the schema of that portion of the underlying database, enabling an administrative user to see and control the access rights at each node and/or relationship via an intuitive and familiar interface and with fine, granular control.

FIG. 5A shows the administrator examining permissions on the sales graph for the role management. FIG. 5A shows that in fact all nodes and relationships in the graph are traversable and that all properties can be read from the MATCH permission for all nodes shown in FIG. 4. FIG. 5A also shows an explicitly set privilege: that users in the management role can write to the VIP property on Customer nodes.

The diagram in FIG. 5A shows all possible permissions on the sales graph for users in the management role. Clicking on any of the permissions allows the administrator to change them. By changing a permission in the user interface tool, the underlying database permissions will change. If the permission being changed is inherited, the tool will create an explicit permission on the current graph, else it will simply change the existing permission on the current graph or add a new existing permission. That is, changing an inherited permission on one graph has no effects in other graphs where that inherited permission is present.

Figure 5B:
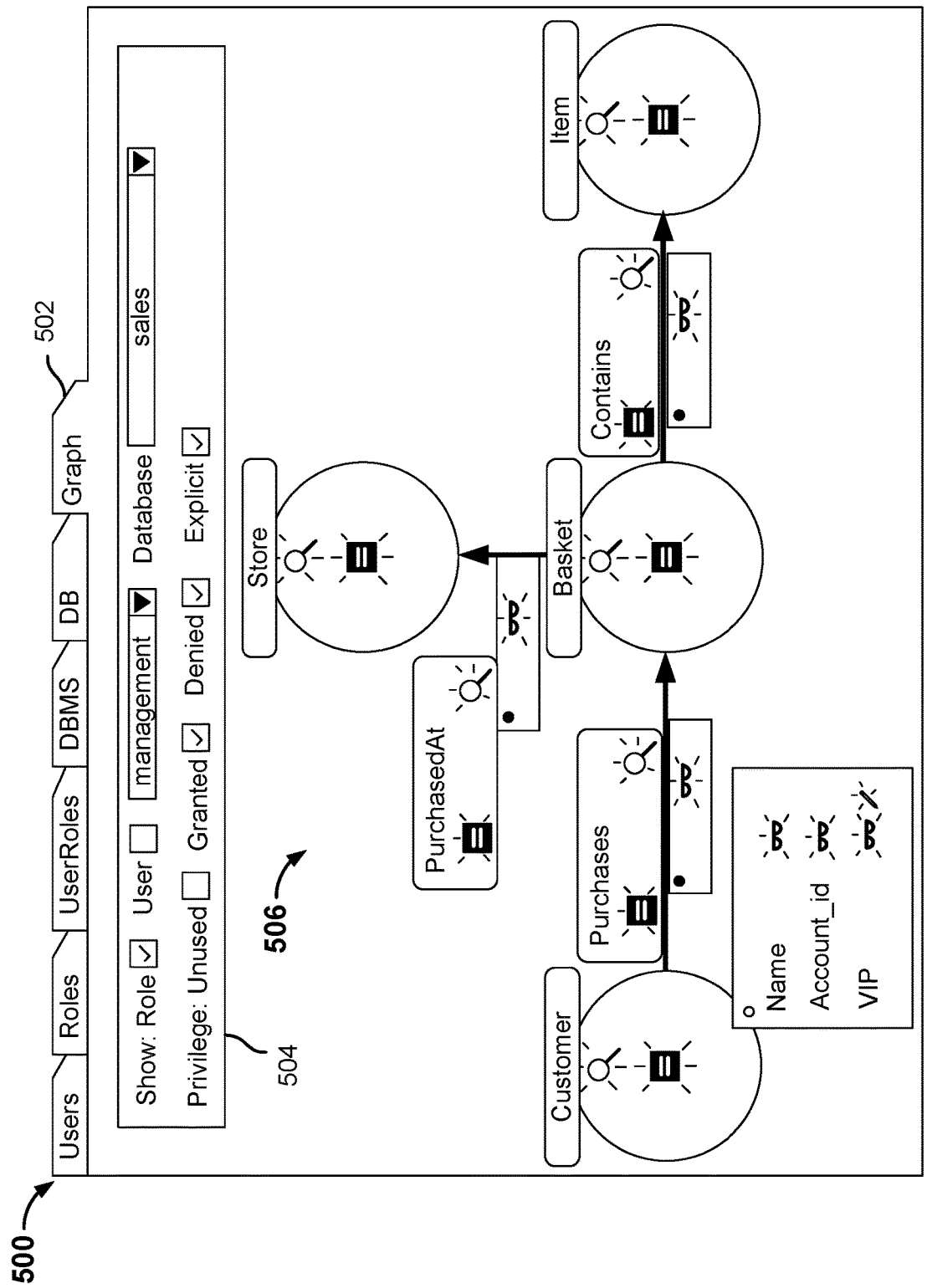
FIG. 5B is a diagram illustrating an example of a user interface page comprising interactive user interface elements in an embodiment of a graph database system.

FIG. 5B is a diagram illustrating an example of a user interface page comprising interactive user interface elements in an embodiment of a graph database system. In the example shown in FIG. 5B, the "Unused" privilege control in control set 504 has been deselected, resulting in only the privileges currently granted to those in the "management" role being displayed. In some embodiments, the view as shown in FIG. 5B is read only. That is, in some embodiments the view as shown in FIG. 5B does not include togglable or otherwise selectable or de-selectable controls. An administrative user would change to the view shown in FIG. 5A to be able to modify privileges.

Figure 6A:
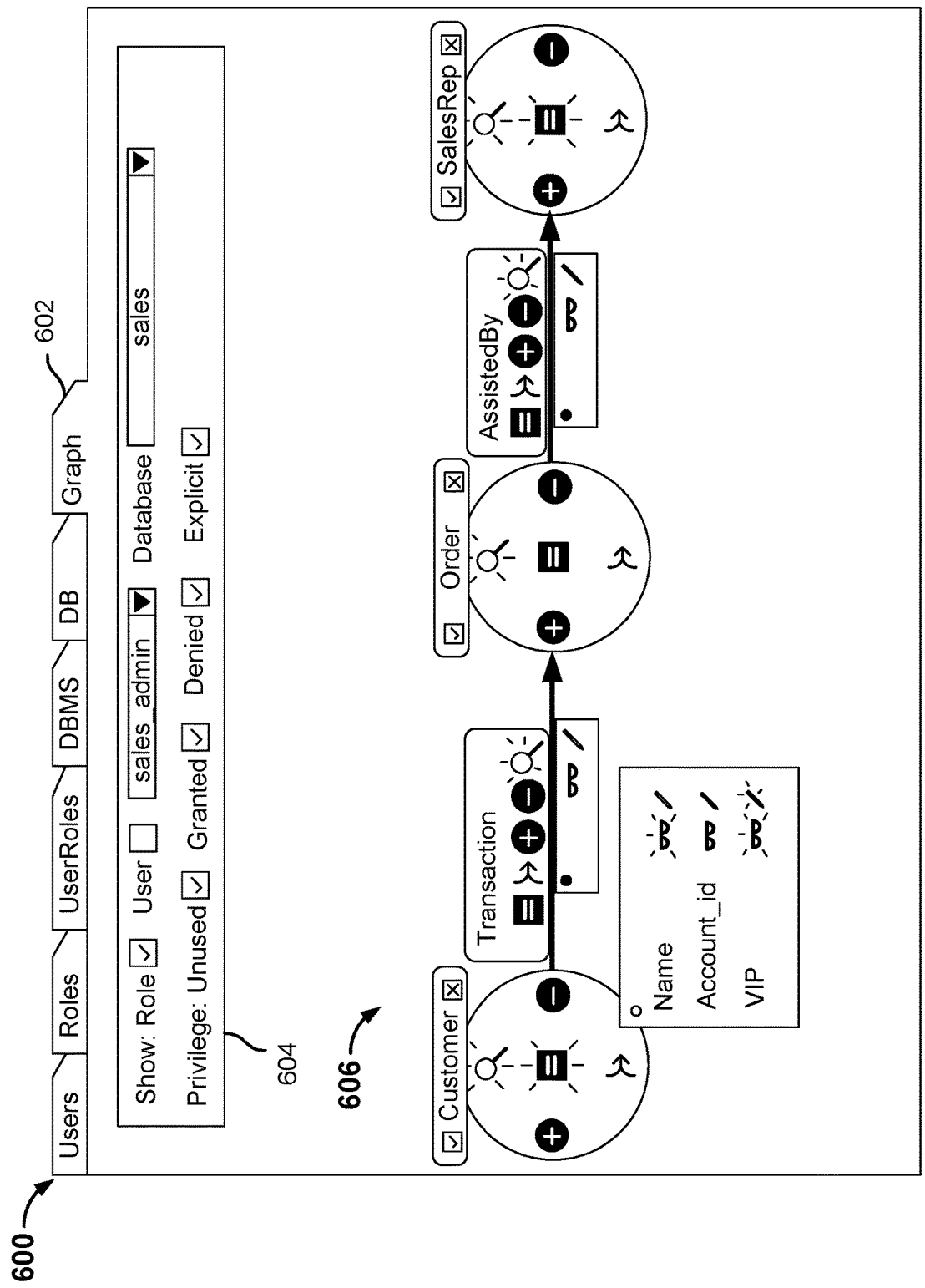
FIG. 6A is a diagram illustrating an example of a user interface page comprising interactive user interface elements in an embodiment of a graph database system.

FIG. 6A is a diagram illustrating an example of a user interface page comprising interactive user interface elements in an embodiment of a graph database system. In the example shown, page 600 includes displayed tab 602 comprising a control set 604 which has been used to select the role "sales_admin" with respect to the "sale" database. A set of access right control components 606 is shown as having been used to grant privileges to read data associated with "Customer" and "SalesRep" nodes, to read some but not all properties of a "Customer" node, and to write (only) the "VIP" property of a "Customer" node. Only the "traverse" privilege has been granted with respect to "Transaction" relationships, "Order" nodes, and "AssistedBy" relationships. As a result, a user having the "sales_admin" role would be able to traverse such relationships and nodes but would not be able to see such relationships or nodes or read any associated data. For example, a query to count the "SalesRep" nodes associated with a "Customer" or to find a "SalesRep" associated with a "Customer" may be allowed, even though the user could not see the intervening relationship and node data.

Figure 6B:
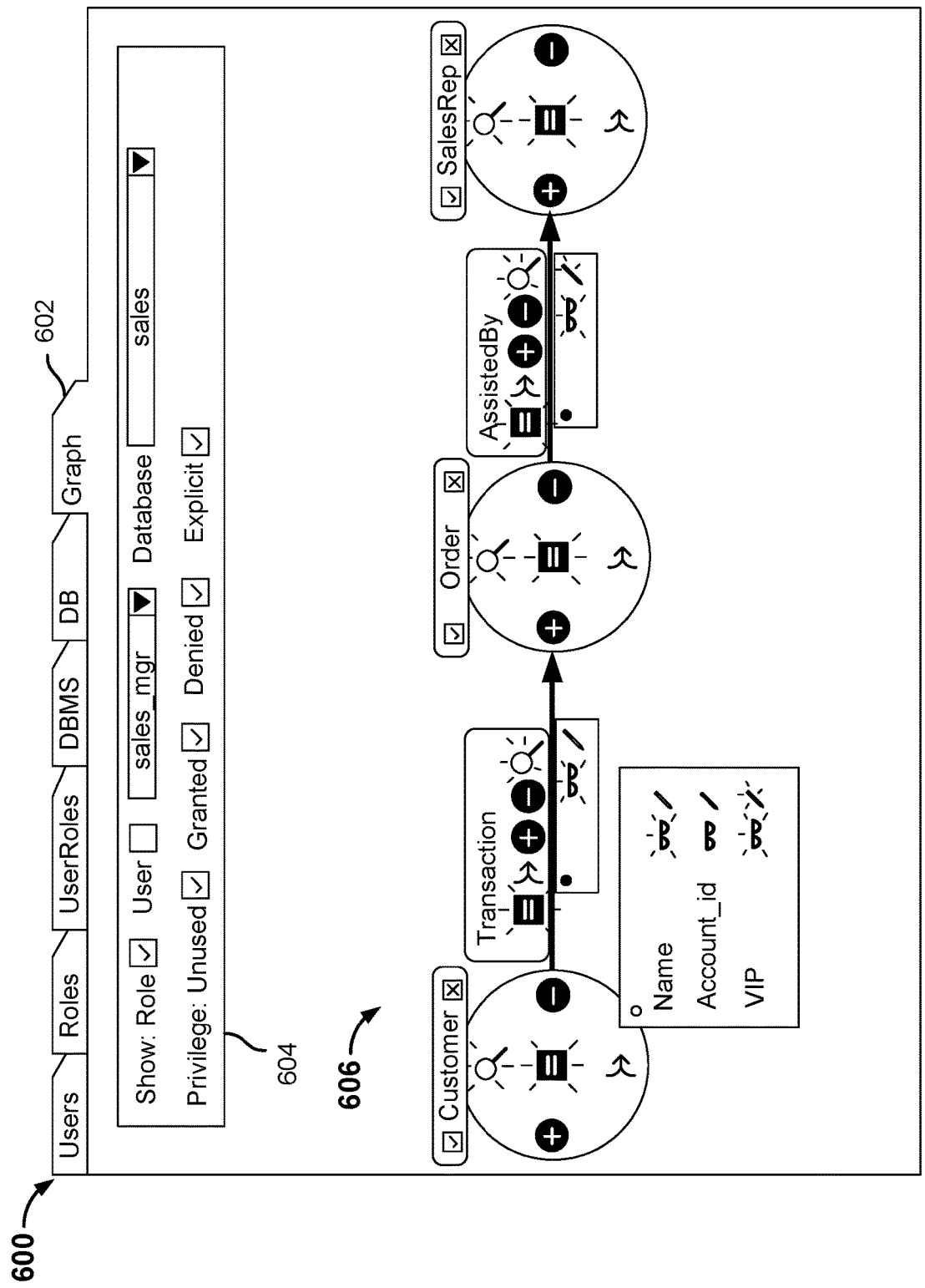
FIG. 6B is a diagram illustrating an example of a user interface page comprising interactive user interface elements in an embodiment of a graph database system.

FIG. 6B is a diagram illustrating an example of a user interface page comprising interactive user interface elements in an embodiment of a graph database system. In the example shown in FIG. 6B, the "sales_mgr" (e.g., sales manager) role has been selected. In contrast to the privileges granted to users in the "sales_admin" role as shown in FIG. 6A, in FIG. 6B uses in the "sales_mgr" role have been granted privileges to read data associated with Transaction relationships, Order, nodes, and AssistedBy relationships, along with the write privilege with respect to attributes of the AssistedBy relationship.

Together, FIGS. 6A and 6B illustrate how the intuitive graph-based user interface disclosed herein may be used to grant or deny access rights at a fine grain level for different roles and/or users of a graph database.

Figure 7:
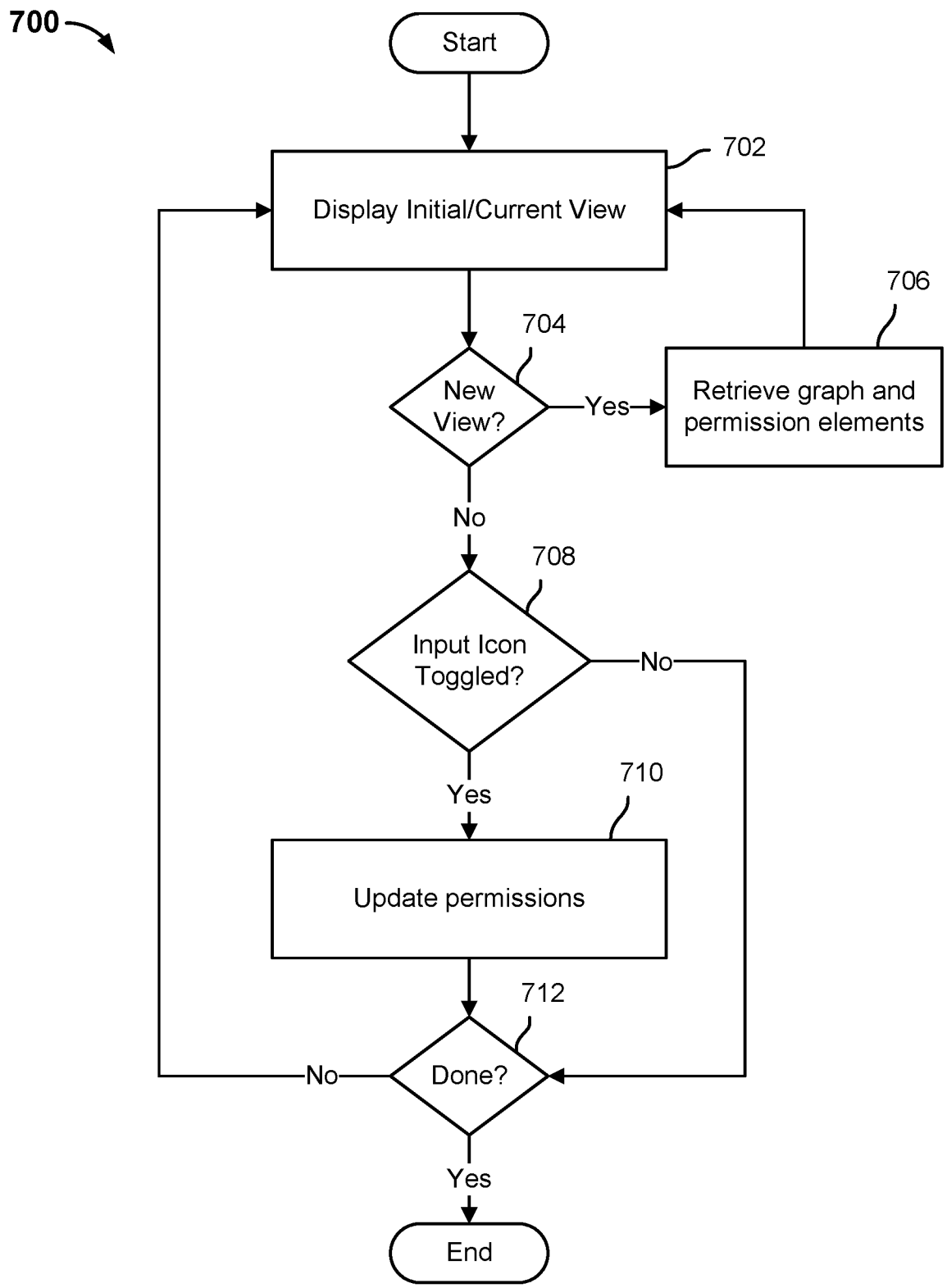
FIG. 7 is a flow diagram illustrating an embodiment of a process to configure privileges with respect to a graph database or portion thereof in an embodiment of a graph database system.

FIG. 7 is a flow diagram illustrating an embodiment of a process to configure privileges with respect to a graph database or portion thereof in an embodiment of a graph database system. In various embodiments, the process 700 of FIG. 7 may be implemented by a computer or other processor, such as graph database access server 110 of FIG. 1 or any graph database management system. In the example shown, at 702 an initial or current view of an interactive access rights control user interface as disclosed herein is displayed. For example, a page as shown in FIG. 4, 5A, 5B, 6A, or 6B may be displayed. If an indication is received at 704 to display a new view, e.g., the user has indicated a new user, role, database, graph, and/or subgraph to be displayed, then at 706 the associated graph and permission data and user interface elements are retrieved and displayed at 702. If an access rights control element is toggled (or other access rights change input is received) at 708, the corresponding access rights data (e.g., as stored in configuration data 208 of FIG. 2) is updated accordingly at 710. Processing continues until done (712), for example if the administrative user closes or navigates away from the interactive user interface.

A system has been disclosed to enable a database administrator to manage the effective set of read, write, and traverse permissions across databases and roles. The system provides a view of a complex, layered set of security rules to the administrator in an intuitive way. It allows the administrator to change both rules specific to the current context (graph and user) and to rules inherited from roles further up the permission tree. In doing so it takes the difficult job of reconciling inherited sets of rules and permissions and simplifies it so that the chance of making errors is reduced and a useful and secure system can be maintained.

A graphical user interface is disclosed that allows a database management system administrator to easily reason about permissions inherited from roles and those that are explicitly defined for a role within a given graph. Since the security rules created depend on the schema (explicit or inferred) of the underlying graph, it is difficult to create faulty rules (e.g., granting a read on a non-existent node label). By combining the graph schema and security rules, the GUI tool can present the logical graph which the current set of inherited and explicit permissions makes accessible. Through this model, the administrator can then change any permissions and immediately be able to review the accessible graph visually.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a memory configured to store access rights data for a plurality of users with respect to a graph database; and
 a processor coupled to the memory and configured to:
  receive via a graphical user interface an input data identifying one or both of a portion of the graph database and a user or role associated with the graph database;
  display via the graphical user interface an interactive interface comprising a representation of the identified portion of the graph database and for each of at least a subset of one or more nodes and one or more relationships comprising the identified portion of the graph database a set of selectable user controls, each selectable user control in the set being configured to be in a selected display state or a not selected display state and each selectable user control in the set being associated with a corresponding set of one or more access rights with respect to the node or relationship with which the selectable user control is associated, the one or more access rights comprising a subset of a plurality of access rights;
  receive via the graphical user interface a user input associated with changing the display state from the selected display state to the not selected display state, or vice versa; and
  update the access rights data as stored in the memory to associate with the identified user or role said set of one or more access rights with respect to the node or relationship in the identified portion of the graph database, in the case of the display state of the selectable user control has been changed d from the not selected display state to the selected display state or, alternatively, updating the access rights data as stored in the memory to remove with respect to the identified user or role said set of one or more access rights with respect to the node or relationship in the identified portion of the graph database in the case of the display state of the selectable user control has been changed from the selected display state to the not selected display state;
 wherein a graph database system with which the graph database is associated is configured to use the access rights data as stored in the memory to control access to the graph database.

2. The system of claim 1, wherein each of at least a subset of the plurality of users is associated with one or more corresponding roles comprising a plurality of roles and the access rights data defines one or more privileges associated with each role in the plurality of roles relative to the graph database.

3. The system of claim 1, wherein the graph database comprises a plurality of graphs and the access rights data defines for each graph with respect to at least a subset of the users a corresponding set of access privileges with respect to that graph or a defined portion thereof.

4. The system of claim 1, wherein the selectable user controls include a read privilege control to grant or deny a read privilege with respect to one or more portions of the graph with which the read privilege control is associated.

5. The system of claim 1, wherein the selectable user controls include a write privilege control to grant or deny a write privilege with respect to one or more portions of the graph with which the write privilege control is associated.

6. The system of claim 1, wherein the selectable user controls include a traverse privilege control to grant or deny a traverse privilege with respect to one or more portions of the graph with which the traverse privilege control is associated.

7. The system of claim 6, wherein the traverse privilege enables a user to which the traverse privilege has been granted with respect to a graph portion to have a query pattern that spans across the graph portion to be matched, and a relevant result to be provided in response to the query, without allowing the user to access data to which the user does not otherwise have access rights.

8. The system of claim 1, wherein for each of said one or more nodes and said one or more relationships comprising the identified portion of the graph database the graphical user interface displays a corresponding subset of the set of selectable user controls in a manner and location that reflects the location and relationship of the node or relationship to other nodes and relationships comprising the identified portion of the graph database as represented in the representation of the identified portion of the graph database.

9. The system of claim 1, wherein set of selectable user controls includes for one or both of a node and a relationship a node or relationship property access rights control.

10. The system of claim 1, wherein the node or relationship property access rights control has a collapsed display state and an expanded display state.

11. The system of claim 10, wherein node or relationship property access rights control includes when in the collapsed display state a single set of controls to set access rights application to all properties of a node or relationship with which the node or relationship property access rights control is associated.

12. The system of claim 10, wherein node or relationship property access rights control includes when in the expanded display state a separate set of controls to set access rights application to a specific property of a node or relationship with which the node or relationship property access rights control is associated.

13. The system of claim 1, wherein each of said selectable user controls has a plurality of display states, each associated with a corresponding state of associated access rights.

14. The system of claim 13, wherein the selectable user controls have three display states and three corresponding access rights state, including: a neutral state associated with an access right inherited from another level; a selected state associated with explicit grant of the associated access right; and a de-selected state associated with explicit denial of the associated access right.

15. The system of claim 1, wherein the graphical user interface includes on or more global controls each configured to be used to grant or deny an associated set of one more access rights with respect to the identified portion of the graph database.

16. The system of claim 1, wherein identified portion of the graph database may include all graphs in the graph database or a specified graph or portion thereof.

17. The system of claim 1, wherein the graphical user interface includes an interactive functionality to enable an administrative user of the graphical user interface to navigate to a selected subgraph of the identified portion of the graph database.

18. The system of claim 17, wherein navigation to the selected subgraph of the identified portion of the graph database results in a representation of the selected subgraph being displayed and for each node and relationship in the selected subgraph a corresponding set of selectable controls.

19. A method, comprising:
receiving via a graphical user interface an input data identifying one or both of a portion of the graph database and a user or role associated with the graph database;
displaying via the graphical user interface an interactive interface comprising a representation of the identified portion of the graph database and for each of at least a subset of one or more nodes and one or more relationships comprising the identified portion of the graph database a set of selectable user controls, each selectable user control in the set being configured to be in a selected display state or a not selected display state and each selectable user control in the set being associated with a corresponding set of one or more access rights with respect to the node or relationship with which the selectable user control is associated, the one or more access rights comprising a subset of a plurality of access rights;
receiving via the graphical user interface a user input associated with changing the display state from the selected display state to the not selected display state, or vice versa; and
updating a set of access rights data as stored in a memory to associate with the identified user or role said set of one or more access rights with respect to the node or relationship in the identified portion of the graph database, in the case of the display state of the selectable user control has been changed d from the not selected display state to the selected display state or, alternatively, updating the access rights data as stored in the memory to remove with respect to the identified user or role said set of one or more access rights with respect to the node or relationship in the identified portion of the graph database in the case of the display state of the selectable user control has been changed from the selected display state to the not selected display state;
wherein a graph database system with which the graph database is associated is configured to use the access rights data as stored in the memory to control access to the graph database.

20. A computer program product embodied in a non-transitory computer readable medium and comprising computer instructions for:
receiving via a graphical user interface an input data identifying one or both of a portion of the graph database and a user or role associated with the graph database;
displaying via the graphical user interface an interactive interface comprising a representation of the identified portion of the graph database and for each of at least a subset of one or more nodes and one or more relationships comprising the identified portion of the graph database a set of selectable user controls, each selectable user control in the set being configured to be in a selected display state or a not selected display state and each selectable user control in the set being associated with a corresponding set of one or more access rights with respect to the node or relationship with which the selectable user control is associated, the one or more access rights comprising a subset of a plurality of access rights;
receiving via the graphical user interface a user input associated with changing the display state from the selected display state to the not selected display state, or vice versa; and
updating a set of access rights data as stored in a memory to associate with the identified user or role said set of one or more access rights with respect to the node or relationship in the identified portion of the graph database, in the case of the display state of the selectable user control has been changed d from the not selected display state to the selected display state or, alternatively, updating the access rights data as stored in the memory to remove with respect to the identified user or role said set of one or more access rights with respect to the node or relationship in the identified portion of the graph database in the case of the display state of the selectable user control has been changed from the selected display state to the not selected display state;
wherein a graph database system with which the graph database is associated is configured to use the access rights data as stored in the memory to control access to the graph database.

\* \* \* \* \*